(12) United States Patent
Dimitrov (10) Patent No.: US 9,662,530 B2
(45) Date of Patent: May 30, 2017

(54) INDUSTRIAL SECURING DEVICE

(71) Applicant: SNAP CLIPS, LLC, Prospect Heights, IL (US)

(72) Inventor: Martin Dimitrov, Wheeling, IL (US)

(73) Assignee: SNAP CLIPS, LLC, Prospect Heights, IL (US)

( * ) Notice: Subject to any disclaimer, the term of this patent is extended or adjusted under 35 U.S.C. 154(b) by 0 days.

(21) Appl. No.: 15/171,657

(22) Filed: Jun. 2, 2016

(65) Prior Publication Data
US 2016/0356293 A1 Dec. 8, 2016

Related U.S. Application Data

(60) Provisional application No. 62/169,985, filed on Jun. 2, 2015.

(51) Int. Cl.
| | | |
|---|---|---|
| *A63B 21/072* | (2006.01) | |
| *F16B 2/00* | (2006.01) | |
| *F16B 2/08* | (2006.01) | |
| *F16B 1/00* | (2006.01) | |

(52) U.S. Cl.
CPC ...... *A63B 21/0728* (2013.01); *A63B 21/0724* (2013.01); *A63B 2209/10* (2013.01); *F16B 2/005* (2013.01); *F16B 2/08* (2013.01); *F16B 2001/0028* (2013.01)

(58) Field of Classification Search
CPC ............ A63B 21/0728; A63B 21/4001; A63B 21/4021; A44C 5/0084; Y10T 24/1457; Y10T 24/1461; Y10T 24/1463
See application file for complete search history.

(56) References Cited

U.S. PATENT DOCUMENTS

| | | | | |
|---|---|---|---|---|
| 3,738,529 A | * | 6/1973 | Rose | B65D 25/34 |
| | | | | 215/395 |
| 5,373,942 A | * | 12/1994 | Weder | A47G 7/085 |
| | | | | 206/423 |
| 5,738,398 A | * | 4/1998 | Miano | A44B 18/00 |
| | | | | 24/442 |

(Continued)

OTHER PUBLICATIONS

Kickstarter.com, "Talon™ Barbell Collar by PRx Performance," (2016). Retrieved from the Internet on Jun. 6, 2016: URL: https://www.kickstarter.com/projects/265236026/talontm-barbell-collar-by-prx-performance/description.

(Continued)

*Primary Examiner* — Daniel Wiley
(74) *Attorney, Agent, or Firm* — Marshall, Gerstein & Borun LLP (57) ABSTRACT

A securing device includes a cover member having a first surface, a second surface disposed opposite the first surface, a first end, and a second end disposed opposite the first end, a resilient member, and a first friction region disposed on the first surface of the cover member. The resilient member is at least partially disposed between the first surface and the second surface of the cover member and is movable between at least a first resting configuration and a second resting configuration. The cover member is adapted to at least partially wrap around an elongated bar when the resilient member is positioned in the second configuration such that the friction region contacts the elongated bar and exerts a frictional force thereon to limit movement of the cover member in an axial direction of the elongated bar.

10 Claims, 5 Drawing Sheets

(56) References Cited

U.S. PATENT DOCUMENTS

| | | | | |
|---|---|---|---|---|
| 5,745,920 A * | 5/1998 | Olivier | ............... | A63B 21/4021 2/161.1 |
| 5,845,804 A * | 12/1998 | Prescott | ............. | B65D 81/3879 215/12.1 |
| 5,857,217 A * | 1/1999 | Hsueh | ................. | A44C 5/0007 2/170 |
| 6,425,494 B1 * | 7/2002 | Woods, II | ......... | B65D 81/3879 215/12.1 |
| 6,564,385 B2 * | 5/2003 | McCarthy | ......... | A63B 21/4021 2/16 |
| 6,829,863 B2 * | 12/2004 | Lovas | ....................... | E06B 1/34 49/462 |
| 7,004,889 B2 * | 2/2006 | McBride | ............ | A63B 21/4021 482/49 |
| 7,494,451 B1 * | 2/2009 | Ramos | ............... | A63B 21/0728 482/107 |
| 8,162,383 B2 * | 4/2012 | Curtis | ................... | B60R 13/043 296/180.4 |
| 8,747,284 B2 * | 6/2014 | Ingram | ............. | A63B 21/1442 482/106 |
| 9,371,118 B2 * | 6/2016 | King | ........................ | B63C 9/00 |
| 2004/0014384 A1 * | 1/2004 | Sloot | ....................... | B32B 27/12 442/131 |
| 2012/0228318 A1 * | 9/2012 | Martin | ............... | A47G 23/0216 220/739 |
| 2013/0331236 A1 * | 12/2013 | Moss | .................. | A63B 21/065 482/93 |
| 2015/0057133 A1 * | 2/2015 | Nguyen | ............. | A63B 21/4019 482/93 |
| 2016/0375295 A1 * | 12/2016 | Brasch | ............... | A63B 21/0728 482/107 |

OTHER PUBLICATIONS

Kickstarter.com, "Slap Wraps Lifting Straps—The Instant Equal Grip," (2016). Retrieved from the Internet on Jun. 6, 2016: URL: https://www.kickstarter.com/projects/39205006/slap-wraps-lifting-straps-the-instant-equal-grip/description.

Americasgreatestmakers.com, "Slapband," (2016). Retrieved from the Internet on Jun. 6, 2016: URL: https://www.americasgreatestmakers.com/team/slapband/.

* cited by examiner

United States Patent US 9,662,530 B2

INDUSTRIAL SECURING DEVICE

CROSS-REFERENCE TO RELATED APPLICATION

This application claims the benefit of U.S. Provisional Application No. 62/169,985, filed on Jun. 2, 2015, the contents of which are herein incorporated by reference in its entirety.

FIELD OF THE DISCLOSURE

The present disclosure generally relates to an industrial securing device and, more particularly, to a quick use device for restricting objects from lateral motion.

BACKGROUND

In fitness environments, individuals can utilize any number of machines or apparatuses for the purpose of exercising. Weightlifting is oftentimes a preferred exercise as it provides for a customizable workout allowing a user to focus on a specific muscle group or groups. Individuals commonly use weight bars to which separate weight plates are added to obtain a desired lifting weight. These weight plates have a central opening that is dimensioned to allow an end of the weight bar to be inserted therethrough, thus the weight bar supports the weight plates when lifting.

In such a configuration, the weight plates can freely move in an axial direction along the weight bar. A physical stop can be provided to limit the weight plates from moving inwardly in the axial direction beyond a certain distance to allow a user to properly grip the bar. However, the ends of the weight bar lack such a stop in order to allow the weight plates to be added and/or removed. As a result, the weight plates can slide off of the end of the bar and can potentially cause damage or bodily injury.

To reduce the possibility of the weight plates moving or falling off of the weight bar, spring collars, clips, or clamps are used which can restrict axial movement of the weight plates. These clips typically include a handle portion and a length of metal which is twisted to form a hollow spring or cylinder dimensioned appropriately relative to the size of the weight bar. To use these clips, a user (i) squeezes the handle portion which temporarily increases the diameter of the opening; (ii) slides the bar through the opening; and (iii) releases the handle portion, thus causing the diameter of the opening to decrease, which in turn creates a clamping force on the weight bar. As a result, axial movement of the clamp, and therefore any weight plates disposed on the bar, is limited.

While these clamps assist in reducing axial movement, they can be susceptible to sliding in the axial direction upon experiencing sufficient forces or weight. As a result, the weight plates can still become detached from the weight bar and can potentially cause damage and/or bodily harm. Further, these clamps can be difficult to sufficiently squeeze and properly align the opening with the weight bar, which can increase downtime between workouts and lead to general dissatisfaction.

In other examples, screw-on stops may be installed on the end members of the weight bar. The installation and removal process can be equally time-consuming as using clamps and may only serve to eliminate the possibility of the weight plates completely falling off the weight bar. However, these devices can still allow the weight plates to move laterally which, in turn, can cause instability while lifting the weights.

SUMMARY

In accordance with one or more aspects, an industrial securing device may address the need for a low-cost, fast, and safe approach to limiting axial movement of items, such as weight plates, disposed on a bar or other support structure. These devices can be quickly coupled to and removed from the weight bar, and can also be adjustable to increase and/or decrease forces exerted on the weight bar to restrict movement. Additionally, these devices can be easily produced in mass quantities, and can be scalable to accommodate objects having varying dimensions.

In accordance with a first exemplary embodiment, a securing device includes a cover member having a first surface, a second surface disposed opposite the first surface, a first end, and a second end disposed opposite the first end, a resilient member, and a first friction region disposed on the first surface of the cover member. In some embodiments, the cover member is constructed from a fabric such as cloth and/or ballistic nylon, and/or a polymer. Other examples of materials are possible. The resilient member is at least partially disposed between the first surface and the second surface of the cover member and is movable between at least a first resting configuration and a second resting configuration. The cover member is adapted to at least partially wrap around an elongated bar when the resilient member is positioned in the second configuration such that the friction region contacts the elongated bar and exerts a frictional force thereon to limit movement of the cover member in an axial direction of the elongated bar.

In one form, the first resting configuration of the resilient member can include a generally planar configuration. The second resting configuration comprises a generally curved configuration. The resilient member can be constructed of spring steel or any other type of resilient material and can have a generally arcuate cross-sectional shape when viewed in a longitudinal direction. In some forms, any number of resilient members can be disposed between the first surface and the second surface of the cover member.

In some approaches, the securing device can include a gripping portion coupled to the first or the second end of the cover member. In these examples, the gripping portion is adapted to assist in urging the resilient member from the second resting configuration to the first resting configuration. In these approaches, the gripping portion can include a component which the user can pull to cause the resilient member (and, accordingly, the securing device) to straighten and become uncoupled from the elongated bar. Other examples of gripping portions are possible. In some of these approaches, the gripping portion includes a securing component that couples to a portion of the second surface of the cover member.

The friction region can be constructed from a number of materials such as, for example, a polymer (such as silicone, rubber, and the like) and/or a coarse material. Other examples are possible. The friction region can include any number of protrusions that can increase friction between the elongated bar and the friction region. In some forms, a second friction region can be disposed on the second surface. Upon positioning the resilient member in the second resting configuration, a portion of the first friction region can contact the second friction region.

In other forms, an approach for coupling a securing device to an elongated weight bar includes first providing the securing device. As stated, the securing device can include a cover member having a first surface, a second surface disposed opposite the first surface, a first end, and a second end disposed opposite the first end, a resilient member at least partially disposed between the first surface and the second surface of the cover member and being movable between at least a first resting configuration and a second resting configuration, and a first friction region disposed on the first surface of the cover member.

The resilient member is then configured in the first resting configuration (if it is not already configured as such). Next, a portion of the first friction region is urged against a surface of the elongated weight bar. Upon being urged against the surface, the resilient member is adapted to "snap" or be urged to the second resting configuration such that the cover member at least partially wraps around the surface and exerts a frictional force thereon to limit movement of the cover member in an axial direction of the elongated bar.

In yet other approaches, a method for manufacturing a securing device is provided. First, a resilient member is disposed between a plurality of layers of a cover member. The cover member is then sealed to enclose the resilient member therein. Finally, a frictional material is applied to at least one surface of the cover member. In some examples, a gripping portion is also coupled to the cover member.

BRIEF DESCRIPTION OF THE DRAWINGS

The above needs are at least partially met through provision of the securing device described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, an industrial securing device is provided. As illustrated in FIGS. 1-8, the industrial securing device 100 includes a cover member 110, a resilient member 130 (illustrated in FIG. 3), and a first friction region 150 (illustrated in FIGS. 3 and 4). In some examples, the device 100 may also include a gripping portion 170 coupled to the cover member 110.

Figure 2:
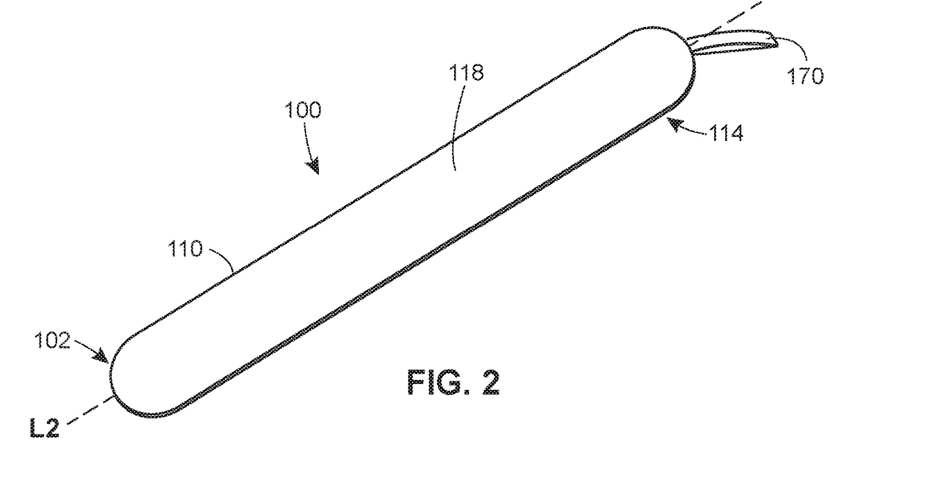
FIG. 2 illustrates a perspective view of the exemplary industrial securing device of FIG. 1 in accordance with various embodiments of the invention.
Figure 3:
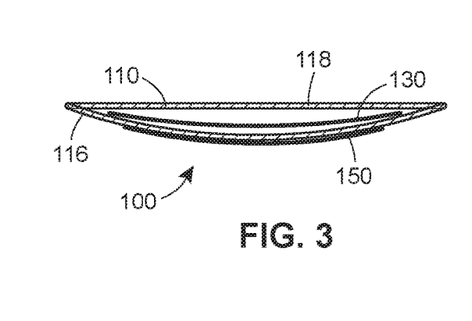
FIG. 3 illustrates a cross-sectional view of the exemplary industrial securing device of FIGS. 1 and 2 taken along a longitudinal length thereof and illustrating a configuration of a resilient member in accordance with various embodiments of the invention.
Figure 4:
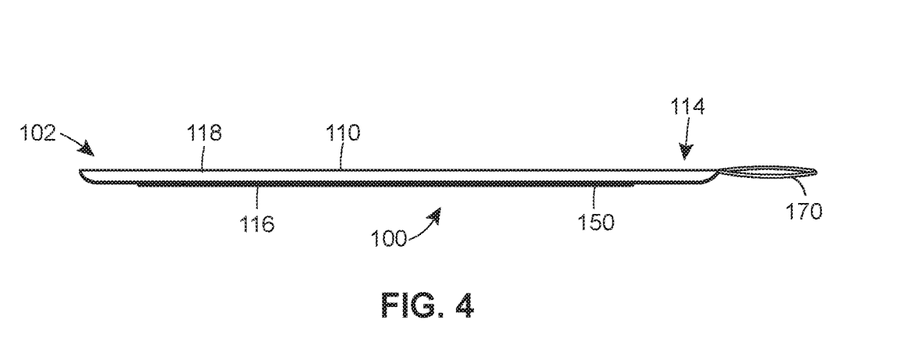
FIG. 4 illustrates a right side elevation view of the exemplary industrial securing device of FIGS. 1-3 in accordance with various embodiments of the invention.

The cover member 110 is a generally elongated, ovaloid component and includes a first surface or layer 116, a second surface or layer 118 (illustrated in FIG. 3), a first end 112 and a second end 114 (illustrated in FIGS. 2 and 4). The first and second surfaces 116, 118 are disposed opposite from eachother and form a generally hollow center portion. The first and second ends 112, 114 are similarly disposed opposite of each other along a lateral axis denoted by L2 in the FIG. 2. The resilient member 130 is at least partially disposed between the first surface 116 and the second surface 118 in the generally hollow center of the cover member 110. The first friction region 150 is disposed on at least a portion of the first surface 116.

The cover member 110 can be made of any type of pliable and/or flexible material. In some examples, the cover member 110 is constructed of a fabric such as ballistic nylon due to its inherent fibrous strength and resistance to wear and tear. Other examples of suitable materials are possible. It is understood that any number of layers of fabric may be used to construct the cover member to selectively adjust the durability thereof. The cover member 110 may be of any suitable dimension such as, for example, a longitudinal length of approximately 7-12 inches, a width of approximately 0.25-5 inches, and a thickness of approximately 0.1-1 inches. Other examples are possible.

The first surface 116 and the second surface 118 of the cover member 110 can be coupled to each other by a number of approaches. In some embodiments, the surfaces 116, 118 are coupled to each other using glues or other adhesives, staples, or other fasteners applied at outer edges thereof. In other examples, the surfaces 116, 118 may be coupled to each other by stitching a pattern along the outer edges. A high-strength material may be used to stitch the surfaces 116, 118 together, and any number of stitching patterns may be used such as, for example, a straight stitch, a zigzag stitch, an overcasting stitch, and/or a joining stitch. Other examples are possible.

The resilient member 130 is a generally thin, elongated component. In many examples, the resilient member is constructed of a material such as spring steel which is either cut or stamped into an elongated or oval shape to include a bend or cavity 132 (illustrated in FIG. 5) in a middle portion thereof which extends a portion (or all) of the length of the member 130. As illustrated in FIG. 3, the resilient member can have a generally arcuate cross-sectional configuration in a longitudinal direction thereof. In some examples, the resilient member 130 is heat treated to create the resilience therein. The resilient member 130 may be of any suitable dimension such as, for example, a longitudinal length of approximately 7-12 inches by a width of approximately 0.25-5 inches and a thickness ranging from $1/64^{th}$-0.5 inches. It is understood that the resilient member 130 may be constructed from any number of suitable materials such as metals, polymers, and the like.

Figures 5, 6:
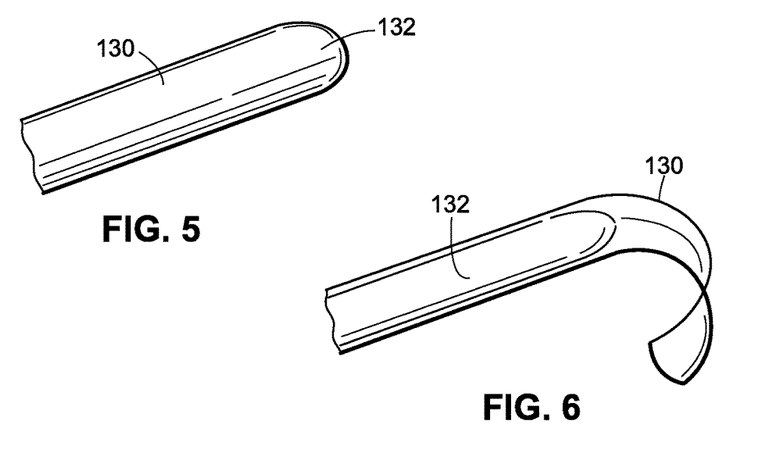
FIG. 5 illustrates a perspective view of an exemplary resilient member of the industrial securing device of FIGS. 1-4 in a first relaxed configuration in accordance with various embodiments of the invention.
FIG. 6 illustrates a perspective view of the exemplary resilient member of FIG. 5 in a partially curved configuration whereby the resilient member is urged towards the second relaxed configuration in accordance with various embodiments of the invention.

As illustrated in FIGS. 5 and 6, the resilient member 130 can be disposed in a number of resting configurations. In the first configuration, and as illustrated in FIG. 5, the resilient member 130 forms the planar, elongated shape as previously described. As shown in FIG. 6, when a sufficient force is exerted against a portion of the bend 132, the bend 132 deforms and causes the resilient member to have a generally flattened area where the bend 132 previously existed. Due to the inherent characteristics of the resilient member 130, this flattening process in turn causes an end of the resilient member 130 to curl onto itself, pressing or deforming the bend 132 out of the member 130 progressively until the resilient member 130 is completely curved or circular when viewed from a side elevation view thereof. As a result, the resilient member 130 rests at a second resting configuration when it is generally curved.

The resilient member 130 is inserted into the opening formed by the first surface 116 and the second surface 118. In some examples, the cover member 110 and the resilient member 130 are each dimensioned to allow a minimal amount of clearance between outer boundaries, but in other examples, ample space is provided in the opening to allow the resilient member 130 to be inserted therein. In some examples, a number of resilient members may be inserted into the opening in a stacked configuration. Doing so can increase the strength of the device 100 to support additional weight and/or forces.

The friction region 150 is a generally thin film material that is disposed on the first surface 116 of the cover member 110. It is understood that in some examples, the friction region 150 can be disposed on the second surface 118. The friction region 150 can occupy any amount of the first surface 116 and can have any number of desired shapes and/or configurations. The friction region 150 can be constructed of any number of materials that create frictional forces with a material coming into contact therewith. For example, the friction region 150 can be constructed of polymers such as silicone, vinyl, nylon, rubber, and the like, or alternatively may be constructed of a coarse material. Other examples are possible. As will be described, when combined with the resilient member 130, the friction region 150 is adapted to generate a frictional force which secures objects and limits movement along a lateral axis.

Figures 7, 8:
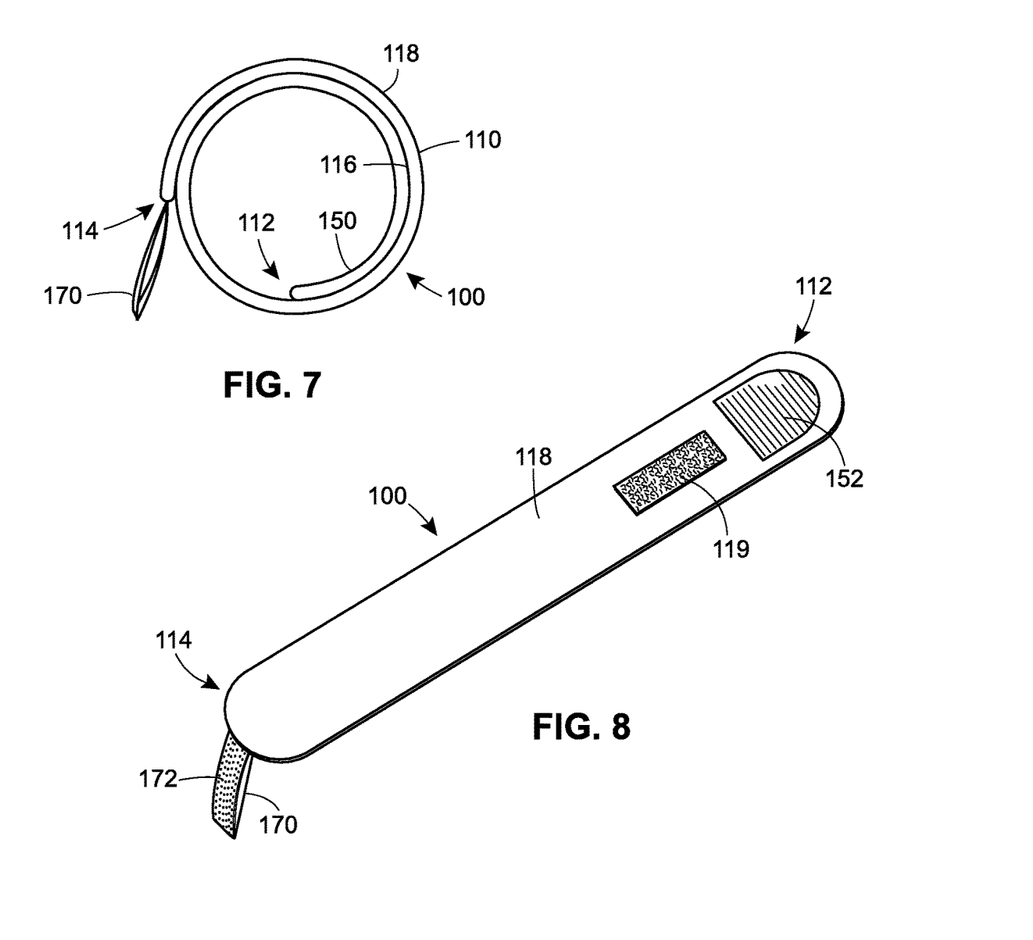
FIG. 7 illustrates a left side elevation view of the exemplary industrial securing device of FIGS. 1-4 when the resilient member is in the second relaxed configuration in accordance with various embodiments of the invention.
FIG. 8 illustrates a perspective view of an exemplary industrial securing device having additional coupling features in accordance with various embodiments of the invention.

When the resilient member 130 is inserted in the cover member 110 and the friction region 150 is applied to the surface 116, the cover member 110 (and thus the friction region 150 and any other additional components) has an orientation that closely mirrors that of the resilient member 130. In other words, when the resilient member 130 is disposed in the first relaxed configuration, the cover member 110 is similarly configured in an elongated and/or oval shape. Similarly, when the resilient member 130 is urged towards and disposed in the second relaxed configuration, the cover member 110 closely mirrors this configuration as illustrated in FIG. 7.

In some forms, the resilient member 130 is coated with an abrasive, tacky, or otherwise friction-increasing material. In these examples, the coating acts as a cover and a continuous friction region. Any number of resilient members 130 can be provided and the abrasive material (such as, for example, silicone) is overmolded directly on top of the resilient member 1130. In these examples, the cover member (and gripping portion, if desired) is formed as a unitary component and does not require any additional coupling stitching, and the like. In these forms, the abrasive material can include rubbers, thermoplastics, silicone, and the like. Other examples are possible.

Figure 11:
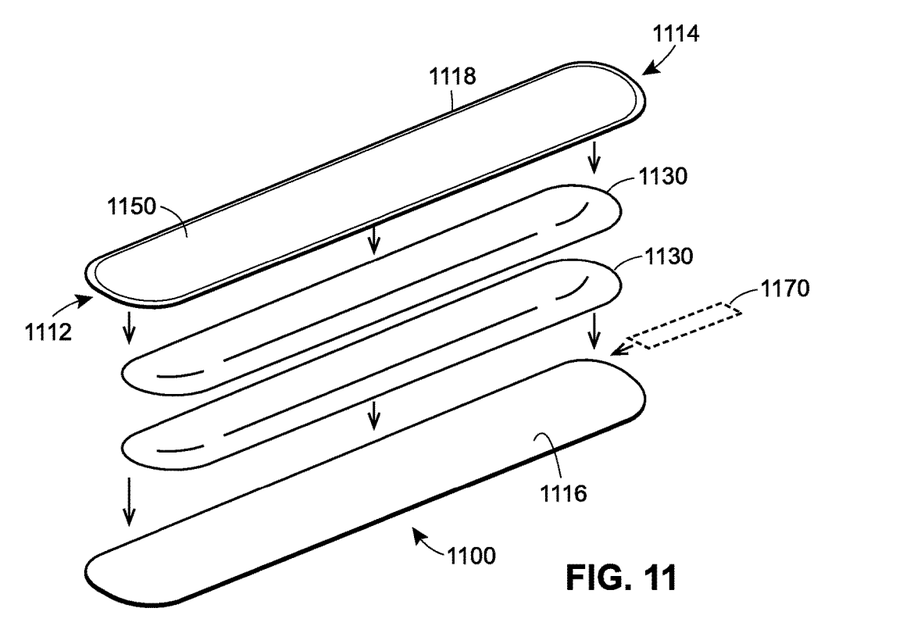
FIG. 11 illustrates a perspective view of an exemplary approach to manufacturing an industrial securing device in accordance with various embodiments of the invention.

Turning briefly to FIG. 11, the device 1100 can be constructed by first disposing any number of resilient members 1130 between a number of layers 1116, 1118 of a cover member. The cover member is then sealed to enclose the resilient member, and a frictional material 1150 is applied to at least one surface of the cover member.

Figure 1:
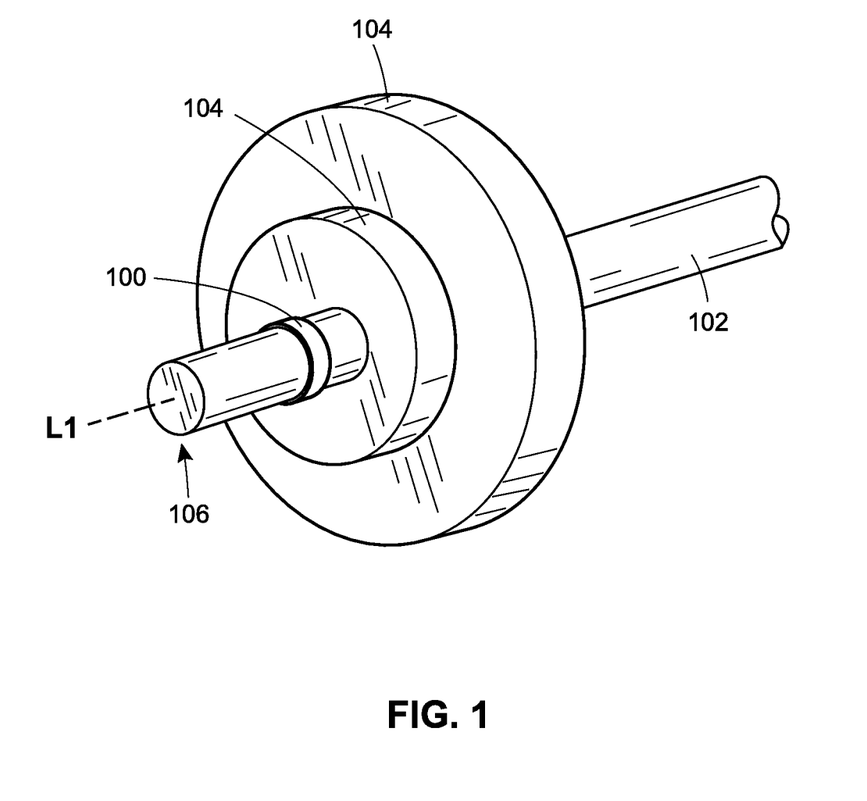
FIG. 1 illustrates a perspective view of an exemplary industrial securing device secured to an elongated weight bar to limit axial movement of weight plates disposed thereon in accordance with various embodiments of the invention.

In operation, and as illustrated in FIG. 1, the device 100 can be applied to a weight bar 102 having a longitudinal axis L1. Any number of weight plates 104 can be disposed on the weight bar 102 by inserting the weight bar 102 through an opening on the weight plate 104. While the opening in the weight plate 104 is sufficient to allow the weight bar 102 to be inserted therethrough, the outer dimension of the device 100, when in the curved second resting configuration, is larger than the opening, thus the weight plate 104 is restricted from moving along the weight bar 102.

The device 100 is first urged to the first relaxed configuration. The first end 112 or the second end 114 is urged against the weight bar 102 in a manner in which the first surface 116 or the friction region 150 contacts the weight bar 102. Upon experiencing this force, the resilient member 130 is adapted to be urged to the second resting configuration. Accordingly, the resilient member 130 begins to curl into a generally curved configuration, thus the cover member 110 wraps around the weight bar 102.

Depending on the characteristics of the resilient member 130, the device 100 exerts a radial clamping force on the weight bar 102. This inward force is combined with a frictional force between the friction region 150 and the weight bar 102 to limit movement along the axis L1. In other words, the frictional force between the device 100 and the weight bar 102 is sufficient enough to withstand forces exerted on the device 100 by the weight plates 104 in the axial direction. It is understood that the device 110 can be dimensioned to allow little, no, or any amount of overlap of the first end 112 and the second end 114 when wrapped around the weight bar 102.

To remove the device 100 from the weight bar, a user can grasp the first or the second end 112, 114 and urge the resilient member 130 towards the first resting configuration. In other words, the user can "unbend" the device 100, and cause it to return to the original, elongated configuration. The device 100 may be caused to return to its original, elongated configuration by pulling on the first or the second ends 112, 114 in a linear direction normal to the longitudinal axis L1. In other examples, the device 100 may be caused to return to its original, elongated configuration by pulling on the first or the second ends 112, 114 in a direction that is tangential to the curve formed while the device is in the second configuration. Other examples are possible.

Figure 10A:
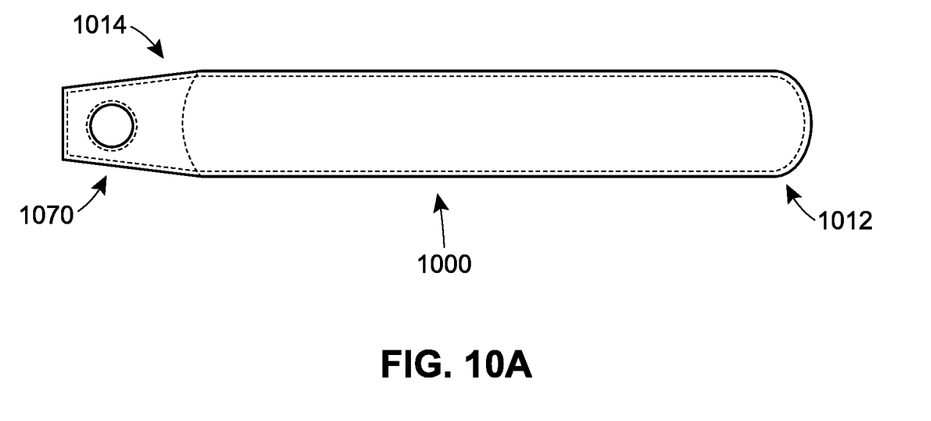
FIGS. 10A and 10B illustrate top plan and right side elevation views, respectively, of an exemplary industrial securing device having alternate gripping portions in accordance with various embodiments of the invention.
Figure 10B:
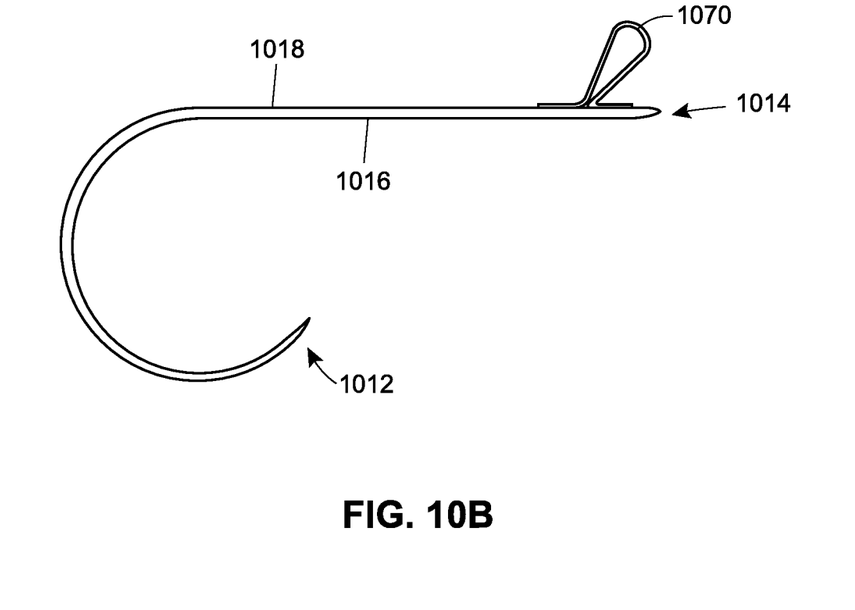

In some examples, the device 100 can include a gripping portion 170 coupled to the second end 114 of the cover member 110 via any suitable approach such as gluing or using other adhesives, stapling, and/or stitching. The gripping portion 170 can be coupled to an outer edge of the cover member 110 or alternatively can be coupled to the first surface 116 or the second surface 118 (as illustrated in FIG. 10B). It is understood that the gripping portion 170 may alternatively be coupled to the first end 112. The gripping portion 170 may be constructed of any number of suitable materials, and may be dimensioned to allow a user to easily grasp to assist in securing or removing the device. In some examples, the gripping portion 170 is formed as a pull tab or a loop. In other examples, and as illustrated in FIG. 10A, the gripping portion 170 can be an extension of the cover material and can include an opening to assist in gripping the region. Other examples are possible. The gripping portion 170 may be reinforced using any number of materials to increase its durability and effectiveness.

In some of these examples, and as illustrated in FIG. 8, the gripping portion 170 may have a securing component 172 which couples to a corresponding securing component 119 disposed on the second surface 118. The securing component 172 may be used to reduce the possibility of the gripping component 170 from unintentionally being gripped or pulled and thus potentially disengaging the device 100 from the weight bar 102. In some examples, the securing components 172, 119 may comprise corresponding hook and loop components. Other examples are possible.

As illustrated in FIG. 8, in some approaches, the second surface 118 may also include a friction region 152. This friction region 152 may have any dimensions and be disposed at any location on the second surface 118 such as near the first end 112. Alternatively, the friction region 152 may cover the entirety of the second surface 118. In these embodiments, when the device 100 is bent over the weight bar 102, the length of the device 100 is greater than the circumference of the weight bar 102. As a result, a portion of the second end 114 can overlap a portion of the first end 112. In this overlapping region, the friction region 150 disposed on the first surface 116 can contact the friction region 152 on the second surface 118 and thus create an area having an increased frictional coupling.

Figure 9A:
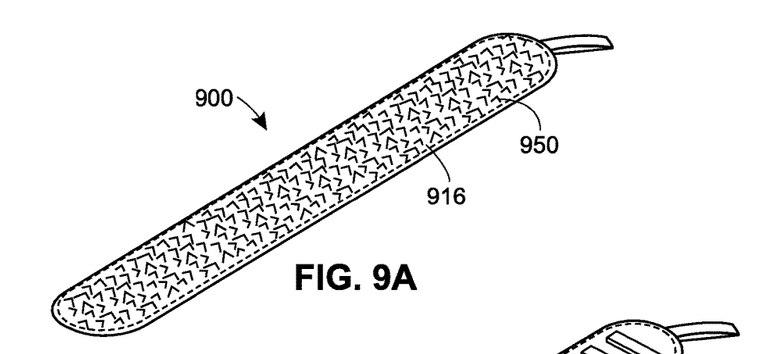
FIGS. 9A and 9B illustrate perspective views of an exemplary industrial securing device having alternate friction regions in accordance with various embodiments of the invention.
Figure 9B:
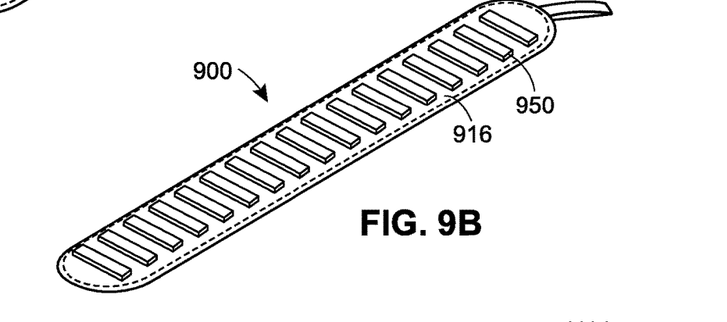

Turning to FIGS. 9A and 9B, an alternative device 900 is provided. It is understood that any and/or all of the features described herein may also be incorporated in the device 900 and will not be discussed in further detail for the sake of brevity. The friction region 950 of FIG. 9A comprises a rough material forming an uneven surface when contacting the weight bar when installed. This rough material may increase the surface area of the friction region 950 to further improve the frictional strength of the device. 9A. Similarly, the friction region 950 of FIG. 9B can include any number of teeth protrusions which can contact the weight bar to increase frictional forces therebetween.

It is understood that the dimensions of any of the components described herein may be modified to accommodate items having varying dimensions. For example, sizes of the cover members, resilient members, and frictional portions may all be increased or decreased in order to secure differently sized items.

So configured, the securing device can be quickly applied to and removed from weight bars or any other desired device to restrict movement of weight plates or any other objects. For example, the device may be used to secure a number of cables, wires, or any other structure or structures having an elongated portion which the device can wrap around. The device can be used as a luggage tag by wrapping around a handle or loop, and can also be used as a food preservation and/or storage device by wrapping around a bag or other enclosing material. Further, the device can be worn by wrapping around a user's arm or leg, and can be easily removed therefrom when it is desired to be used on a weight bar or other structure.

The device is adjustable by selectively increasing and/or decreasing the number of resilient members disposed in the cover member. By adding or subtracting resilient members, the total clamping and frictional forces exerted by the device on the bar can be increased or decreased, respectively. By coupling a gripping portion to the device, ease of use is further increased. The device may be long lasting and require minimal upkeep to maintain operability.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A securing device, the securing device comprising:
   a cover member comprising a first surface, a second surface disposed opposite the first surface, a first end, and a second end disposed opposite the first end;
   a resilient member being at least partially disposed between the first surface and the second surface of the cover member, the resilient member being movable between at least a first resting configuration and a second resting configuration;
   a first friction region disposed on the first surface of the cover member; and
   a gripping portion coupled to one of the first end and the second end of the cover member, wherein the gripping portion comprises a securing component adapted to couple to a portion of the second surface of the cover member;
   wherein the cover member is adapted to at least partially wrap around an elongated bar when the resilient member is positioned in the second configuration such that the first friction region contacts the elongated bar and exerts a frictional force thereon to limit movement of the cover member in an axial direction of the elongated bar, wherein the gripping portion is adapted to assist in urging the resilient member from the second resting configuration to the first resting configuration.

2. The securing device of claim 1, wherein the first resting configuration comprises a generally planar configuration and the second resting configuration comprises a generally curved configuration.

3. The securing device of claim 1, wherein the resilient member is constructed of spring steel and has a generally arcuate cross-sectional shape in a longitudinal direction thereof.

4. The securing device of claim 1, further comprising a plurality of resilient members each having an elongated shape, wherein the plurality of resilient members are disposed in a stacked configuration such that the elongated shape of each of the plurality of resilient members are arranged in a parallel orientation.

5. The securing device of claim 1, wherein the first friction region is constructed from a polymer.

6. The securing device of claim 5, wherein the first friction region includes a plurality of protrusions adapted to increase the frictional force between the elongated bar and the friction region.

7. The securing device of claim 1, wherein the cover member is constructed from at least one of a fabric and a polymer.

8. The securing device of claim 1 further comprising a second friction region disposed on the second surface, wherein upon positioning the resilient member in the second resting configuration, at least a portion of the first friction region contacts the second friction region.

9. The securing device of claim 1, wherein the gripping portion comprises a looped pull tab.

10. The securing device of claim 1, wherein the second surface of the cover member further comprises a securing component disposed a distance from one of the first end and the second end of the cover member, the securing component adapted to mate with the securing component of the gripping portion.

* * * * *